Jan. 3, 1933.  E. C. HORTON  1,893,472
MIRROR SUPPORT AND METHOD OF MAKING SAME
Filed July 18, 1929
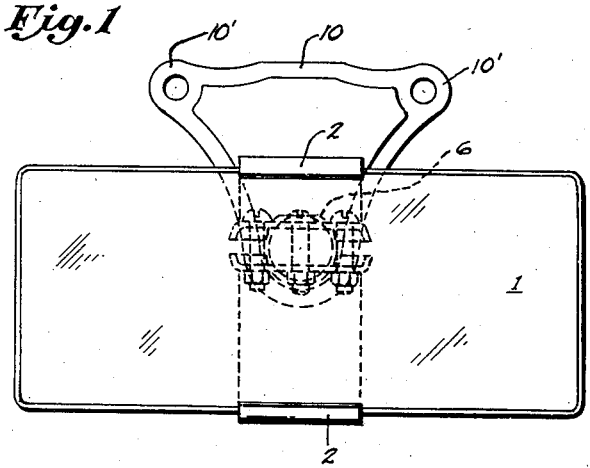
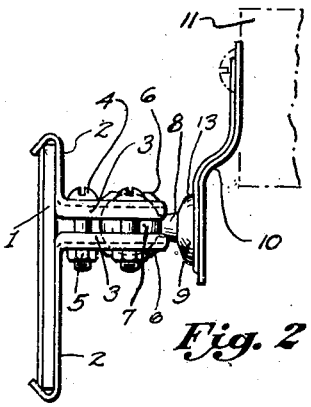
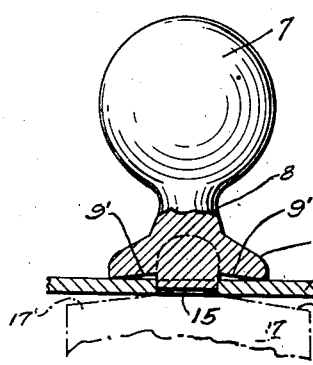
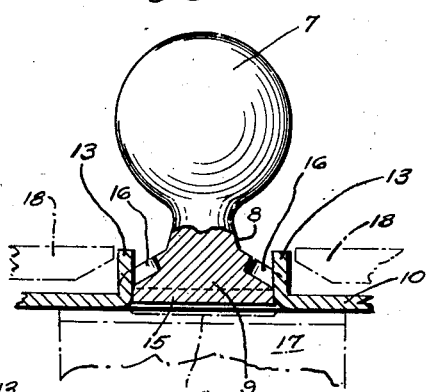
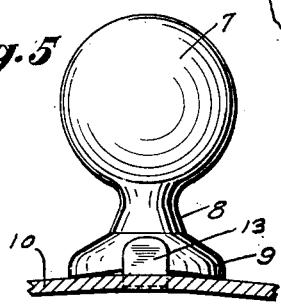
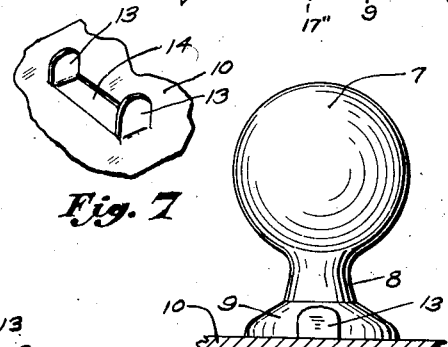
Erwin C. Horton Inventor
by Barton A. Bean Jr.
Attorney Patented Jan. 3, 1933

1,893,472

UNITED STATES PATENT OFFICE

ERWIN C. HORTON, OF HAMBURG, NEW YORK, ASSIGNOR TO TRICO PRODUCTS CORPORATION, OF BUFFALO, NEW YORK

MIRROR SUPPORT AND METHOD OF MAKING SAME

Application filed July 18, 1929. Serial No. 379,121.

This invention appertains to the attachment of a part to metal plates, and primarily is shown in the mounting of the ball part of a ball and socket mounting for rear view mirrors for vehicles.

The ball member of these mirror supports have usually been turned down on a lathe and attached to a supporting plate by riveting. The ball is turned down from a rod of brass, or other suitable metal, a specially formed base shaped thereon, and this base inserted in an aperture in the supporting plate and riveted over. These operations are expensive, time-consuming and involved, and do not insure a satisfactory mounting for the ball.

An object of the invention is realized in the provision of improved means for securing the ball part or member to its supporting member. The invention also resides in an improved method of attaching the ball to its bracket and in an improved mounting by which the ball part is firmly secured in position thereon.

In the accompanying drawing,

Fig. 1 is an elevational view of the mirror looking at the reflecting surface.

Fig. 2 is a side elevation of the structure shown in Fig. 1.

Fig. 3 is a fragmentary sectional view illustrating an initial step in the method of attaching the ball part to its supporting plate.

Fig. 4 is a partial cross section at right angles to the showing of Fig. 3 with the parts positioned in a die for the ear-bending operation.

Fig. 5 is an elevation of the ball part as finally secured to its supporting plate.

Fig. 6 is a view similar to Fig. 5 but showing an alternative securing means.

Fig. 7 is a fragmentary perspective view of the supporting plate illustrating the opening and ears thereof ready for the reception of the part to be attached.

The rear view mirror comprises a reflector body 1 held between a pair of clamping jaws 2 which jaws extend across the back of the mirror and terminate in outwardly projecting flanges 3. A plurality of screws 4 and nuts 5 cooperate to draw the flanges 3 toward each other, thereby clamping the mirror 1 in position. The flanges 3 are provided with countersunk seats 6 to receive a ball 7 having a shank 8 and a base 9. The base 9 is secured to a mounting plate or bracket 10 in a manner presently to be described and the mounting plate is adapted to be secured to the header bar 11 of a windshield as by screws being passed through the apertured ears 10' of the plate.

The mounting bracket 10 has struck therefrom a pair of opposed ears 13 leaving an interposed elongated opening 14, and the base 9 is provided with a locating lug or boss 15, conformably fitting said plate opening 14. The upper surface of the base is shown sloping upwardly and provided with a pair of seats 16 for receiving the ears 13. The engagement of the lug 15 in its opening 14 therefore insures the proper disposition of the recesses or seats 16 relative to said ears 13. When assembling the ball and plate, the boss 15 is inserted in the plate opening 14 to thereby locate the base relatve to the ears, and the two parts are then placed upon a die or anvil 17 as shown in Figs. 3 and 4.

The bottom surface of the base 9 at opposite sides of the boss 15 may be flat, as in Fig. 6, or shaped with an inward and upward bevel 9', as in Figures 3 and 5, and the top surface of the die 17 is correspondingly shaped or chamfered, as at 17', whereby the interlying plate 10 is caused to spring upwardly within the more or less hollowed base 9. A pair of punches 18 is adapted to move downwardly and bend the ears 13 into the seats 16 in the base 9, and in so doing the pressure exerted during this operation causes the mounting plate 10 to conform resiliently to the angular faces 17' and 9' of the die 17 and the base 9, respectively. When the pressure of the punches 18 is removed the mounting plate 10 tends to return to its original shape and in so doing its immediate underlying portion is urged away from the bottom of the base 9, thereby drawing the ears 13 more securely into their seats 16 and holding them under tension against looseness therein.

The die 17 may be provided with sufficient clearance, as indicated at 17'', to permit slight downward movement of the base and its lug 15 when the ears 13 are engaged in their seats. It will, therefore, be noted that the die provides spaced points of support for the plate 10 at points immediately beneath the ears 13 so that while the ears are given solid support during the engagement of the ears with their seats 16, the interposed base portion or lug 15 may yield under the pressure. Thus when the pressure is removed the ears will be more firmly seated and the plate 10 will be more or less drawn or bowed in toward the undercut faces 9', as indicated on an enlarged scale in Figure 5. As the ears are being bent into their seats 16 the operating punches 18 simultaneously subject the base 9 to a downward pressure so that the base will move downwardly against the tension of the plate 10 by reason of the lack of support given to the base at points between the spaced ears.

This construction provides a joinder of the ball and the plate which will not be apt to jar loose or vibrate in spite of the adverse conditions under which a device of this character frequently operates.

The ball part, which term has been used herein broadly, may be cast by a simple operation and does not require any special machining. By the improved manner and method of attachment, it is durably secured to its mounting plate without riveting, so that the manufacture and attachment of the ball part to the mounting plate are both economically and expeditiously accomplished.

What is claimed is:

1. In the production of a bracket member having a member and a resilient plate attached thereto having a portion lying adjacent a receding face of said member and an ear to be clenched over an opposing face of said member, the process of flexing the plate toward the receding face to place the plate in tension and clenching the ear over said opposing face, whereby the resilience of the plate will thereafter urge the ear into close contact with said opposing face.

2. In a mirror mounting, or the like, a supporting plate having spaced attaching ears and an adjacent locating aperture, and a part having a base provided with seats for the ears and a locating lug shaped to enter the aperture for locating the seats relative to the ears.

3. In a mirror mounting, a mirror engaging member, a mounting member, a socket part carried by one member, a plurality of ears formed from the other of said members, and a ball part cooperable with said socket part and secured by said ears to said ear-carrying member said ears being clenched over the ball part.

4. In a device of the class described, a mirror supporting member, a mounting member, an aperture in one of said members, a plurality of ears formed adjacent said aperture, and a ball member having a projection engaged in said aperture, said ears engaging said ball member, the other of said first mentioned members engaging about the ball of the ball member to provide a universally adjustable connection.

5. In a device of the class described, a mirror supporting member, a mounting member, a non-circular aperture in one of said members, a plurality of ears formed adjacent said aperture, and a part connected to the other of said first mentioned members and having a non-circular projection to enter said aperture and also having recessed seats to receive said ears, said projection and aperture cooperating to locate the ears relative to said seats.

6. In a device of the class described, a mirror holding member, a mounting member, one of said members being resilient, a plurality of ears formed in said resilient member, and a ball member havng a curvilinear base, said ears being deformed to clinch said base, said ear-carrying member being simultaneously flexed to conform to the curvature of the base whereby the inherent resiliency of said member will cause the ears to more firmly secure said ball member, the other of said first mentioned members engaging the ball of the ball member to provide a universally adjustable connection.

7. In a device of the class described, a mirror holding member, a mounting member, a plurality of ears formed in said mounting member, and a ball member having a curvilinear base provided with a plurality of seats adapted to receive said ears, said ears being bent to engage said seats and secure said ball member, and said mounting member being simultaneously flexed to conform to the curvature of the base whereby to cause the ears to more securely retain the ball member, the other of said first mentioned members engaging the ball of the ball member to provide a universally adjustable connection.

8. The method of securing a fitting having a curvilinear base to a sheet provided with a plurality of upwardly bent ears, wherein the assembled parts are placed upon an anvil having a surface corresponding in curvature to the base of the fitting and operated upon by punches adapted to form said ears about said base and to simultaneously flex the sheet due to the pressure of the curved surfaces so that upon removal of the assembled structure from the anvil the sheet will tend to reassume its natural shape thereby causing the ears to more securely grip the base of the fitting.

9. The method of securing a ball part having a recessed base to a bracket part provided with an ear to be engaged in the recess of said base, consisting in locating the ear relative to the base recess by means of an aperture in one part receiving a lug on the companion part, subjecting one part to tension, and engaging the ear in its recess while said part is under tension.

10. The method of securing a ball part to a bracket part consisting in striking up from the bracket a pair of ears, forming in the base of the ball part on its upper side a pair of seats for receiving the ears, supporting the bracket part at points immediately beneath the ears and leaving the portion of the bracket part intermediate said ears unsupported, interposing the ball part between the ears, and then bending said ears over into said seats.

11. The method of securing a fitting to a plate-like part, consisting in providing said fitting with a base having a pair of upwardly facing seats and an interposed downwardly extending lug, undercutting the bottom side of the base on opposite sides of said lug, forming said part with a pair of ears and an interposed opening to receive said lug, supporting said part at points beneath said ears and leaving the intermediate portion unsupported, positioning said fitting on said part with the lug engaged in the opening and the seats opposed to said ears, then bending said ears downwardly into said seats and simultaneously applying downward pressure on said base of the fitting to place the adjacent portion of said part under tension.

12. In an accessory mounting, a resilient member and an element in abutment therewith, said element having the face thereof adjacent the member recessed, portions extending from said member and engaged over parts of said element, and said resilient member being initially flexed into said recess when said portions are engaged over said parts of the element, whereby the resiliency of said member will cause said portions to firmly engage said element.

13. In an accessory mounting, a pair of adjacent members, one of the members being resilient and normally being of different contour than the adjacent face of the other member, said resilient member being flexible into substantial conformity with said face, and means carried by one of said members and engaged with the other thereof while said resilient member is flexed into conformity with said face, whereby said resilient member will tend to resume its normal contour to place said means under tension.

ERWIN C. HORTON.